(12) United States Patent
Guzman et al.

(10) Patent No.: US 12,188,569 B2
(45) Date of Patent: Jan. 7, 2025

(54) PRESSURE RELIEF DEVICE

(71) Applicants: BS&B INNOVATIONS LIMITED, Limerick (IE); Mayra Guzman, Monterrey (MX); Geoffrey Brazier, Woodbury, MN (US)

(72) Inventors: Mayra Guzman, Monterrey (MX); Geoffrey Brazier, Woodbury, MN (US)

(73) Assignee: BS&B INNOVATIONS LIMITED, Limerick (IE)

( * ) Notice: Subject to any disclaimer, the term of this patent is extended or adjusted under 35 U.S.C. 154(b) by 0 days.

(21) Appl. No.: 17/641,335

(22) PCT Filed: Sep. 9, 2020

(86) PCT No.: PCT/US2020/049849
§ 371 (c)(1),
(2) Date: Mar. 8, 2022

(87) PCT Pub. No.: WO2021/050486
PCT Pub. Date: Mar. 18, 2021

(65) Prior Publication Data
US 2022/0356957 A1    Nov. 10, 2022

Related U.S. Application Data

(60) Provisional application No. 62/897,626, filed on Sep. 9, 2019.

(51) Int. Cl.
*F16K 17/16* (2006.01)
*F16K 17/02* (2006.01)
(52) U.S. Cl.
CPC .......... *F16K 17/162* (2013.01); *F16K 17/025* (2013.01); *F16K 17/16* (2013.01)

(58) Field of Classification Search
CPC ....... F16K 17/162; F16K 17/025; F16K 17/16
USPC ..................... 137/68.25, 68.19, 68.21, 68.27
See application file for complete search history.

(56) References Cited

U.S. PATENT DOCUMENTS

| | | | | |
|---|---|---|---|---|
| 3,087,643 A | * | 4/1963 | Smirra | F16K 13/04 220/267 |
| 3,109,554 A | * | 11/1963 | Porter | F16K 17/162 220/89.2 |
| 3,612,345 A | * | 10/1971 | Fike, Jr. | F16K 17/1606 220/89.2 |
| 3,698,598 A | * | 10/1972 | Wood | F16K 17/162 220/89.2 |

(Continued)

FOREIGN PATENT DOCUMENTS

| | | |
|---|---|---|
| CN | 209 164 685 U | 7/2019 |
| CN | 209 325 121 U | 8/2019 |
| GB | 2 136 879 A | 9/1984 |

OTHER PUBLICATIONS

International Search Report and Written Opinion for International Application PCT/US2020/049849, dated Dec. 17, 2020.

*Primary Examiner* — Minh Q Le
(74) *Attorney, Agent, or Firm* — FINNEGAN, HENDERSON, FARABOW, GARRETT & DUNNER LLP

(57) ABSTRACT

A vacuum resistant pressure relief device is (100) disclosed. In one embodiment, a pressure relief device may be an explosion vent. The explosion vent may be provided with one or more ribbed features, which may be radial ribbed features (101).

5 Claims, 12 Drawing Sheets

(56) References Cited

U.S. PATENT DOCUMENTS

| | | | | |
|---|---|---|---|---|
| 3,704,807 A * | 12/1972 | Lidgard | F16K 17/162 | 220/89.2 |
| 3,709,239 A * | 1/1973 | Morck, Jr. | F16K 17/162 | 220/89.2 |
| 3,881,629 A * | 5/1975 | Shaw | F16K 17/162 | 220/89.2 |
| 4,067,154 A * | 1/1978 | Fike, Jr. | H05K 5/068 | 52/99 |
| 4,612,739 A * | 9/1986 | Wilson | F16K 17/162 | 220/89.2 |
| 4,662,126 A * | 5/1987 | Malcolm | B65D 90/36 | 52/167.9 |
| 4,787,180 A * | 11/1988 | Robinson | B65D 90/36 | 52/200 |
| 4,819,823 A * | 4/1989 | Kadakia | F16K 17/162 | 220/89.2 |
| 4,905,722 A | 3/1990 | Rooker et al. | | |
| 5,002,085 A * | 3/1991 | FitzGerald | F16K 17/162 | 137/68.27 |
| 5,197,622 A * | 3/1993 | Anderson | B65D 83/70 | 137/910 |
| 5,368,180 A * | 11/1994 | Farwell | F16K 17/162 | 220/89.2 |
| 5,678,307 A * | 10/1997 | Farwell | F16K 17/1606 | 29/890.12 |
| 6,062,599 A * | 5/2000 | Forbes | F16K 13/06 | 220/89.2 |
| 6,607,003 B1 * | 8/2003 | Wilson | F16K 17/16 | 137/68.27 |
| 8,522,808 B2 * | 9/2013 | Ikeda | H01M 50/3425 | 137/68.27 |
| 2004/0172889 A1 * | 9/2004 | Eijkelenberg | B65D 90/36 | 52/99 |
| 2005/0235584 A1 * | 10/2005 | Farwell | F16K 17/16 | 52/202 |
| 2010/0224603 A1 * | 9/2010 | Modena | F16K 17/16 | 219/121.72 |
| 2016/0018014 A1 * | 1/2016 | Modena | B23K 26/0624 | 137/68.27 |

* cited by examiner

300

400

500

700

800

PRESSURE RELIEF DEVICE

CLAIM FOR PRIORITY

This application is a U.S. national phase entry under 35 U.S.C. § 371 from PCT International Application No. PCT/US2020/049849, filed Sep. 9, 2020, which claims the benefit of priority of U.S. Patent Application No. 62/897,626, filed Sep. 9, 2019, from both of which this application claims priority and both of which are incorporated herein by reference.

FIELD OF THE DISCLOSURE

This disclosure is directed to the field of pressure relief devices. More particularly, the disclosure relates to pressure relief vents, burst panels, rupture disks, or other devices designed to open during an explosion or in response to a predetermined pressure differential to reduce damage.

BACKGROUND OF THE DISCLOSURE

Pressure relief devices are commonly used as safety devices in systems containing pressurized fluids in gas or liquid form, or in contained systems containing volatile (e.g., flammable) conditions that may lead to a potentially dangerous increase in pressure. A pressure relief device will vent fluid from a system when the pressure in the system reaches a predetermined level—usually before it reaches an unsafe level. One category of pressure relief device—a membrane pressure relief device—includes, e.g., rupture disks and burst panels, also known as explosion vents.

It may be desirable for a membrane pressure relief device to exhibit resistance to reverse-pressure (e.g., a partial- or full-vacuum condition) in the event of a pressure drop within the enclosed system. One example of a rectangular flat-panel explosion vent may be provided with some resistance to reverse pressure by way of a diagonal (e.g., X-shaped) pattern of creases. Such creases may provide slight rigidity and slight vacuum resistance. Such vents are typically rated for pressures up to around 0.1 bar and have a vacuum resistance of 0.05 bar—less than the rated set pressure of the vent. Another example of a flat-panel explosion vent may be provided with some resistance to reverse pressure by way of "skeletal-type" bulges and/or rib-like features oriented parallel to a perimeter of the vent. Once again, such vents are typically rated for pressures up to around 0.1 bar and have a vacuum resistance of 0.05 bar—less than the rated set pressure of the vent.

The present disclosure recognizes a need for a membrane pressure relief device with improved vacuum resistance, particularly in a membrane pressure relief device having no secondary member as a vacuum support. The present disclosure provides one or more of these, and/or other, advantages.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

DESCRIPTION OF THE EMBODIMENTS

Reference will now be made in detail to the present exemplary embodiments, examples of which are illustrated in the accompanying drawings.

Figure 1:
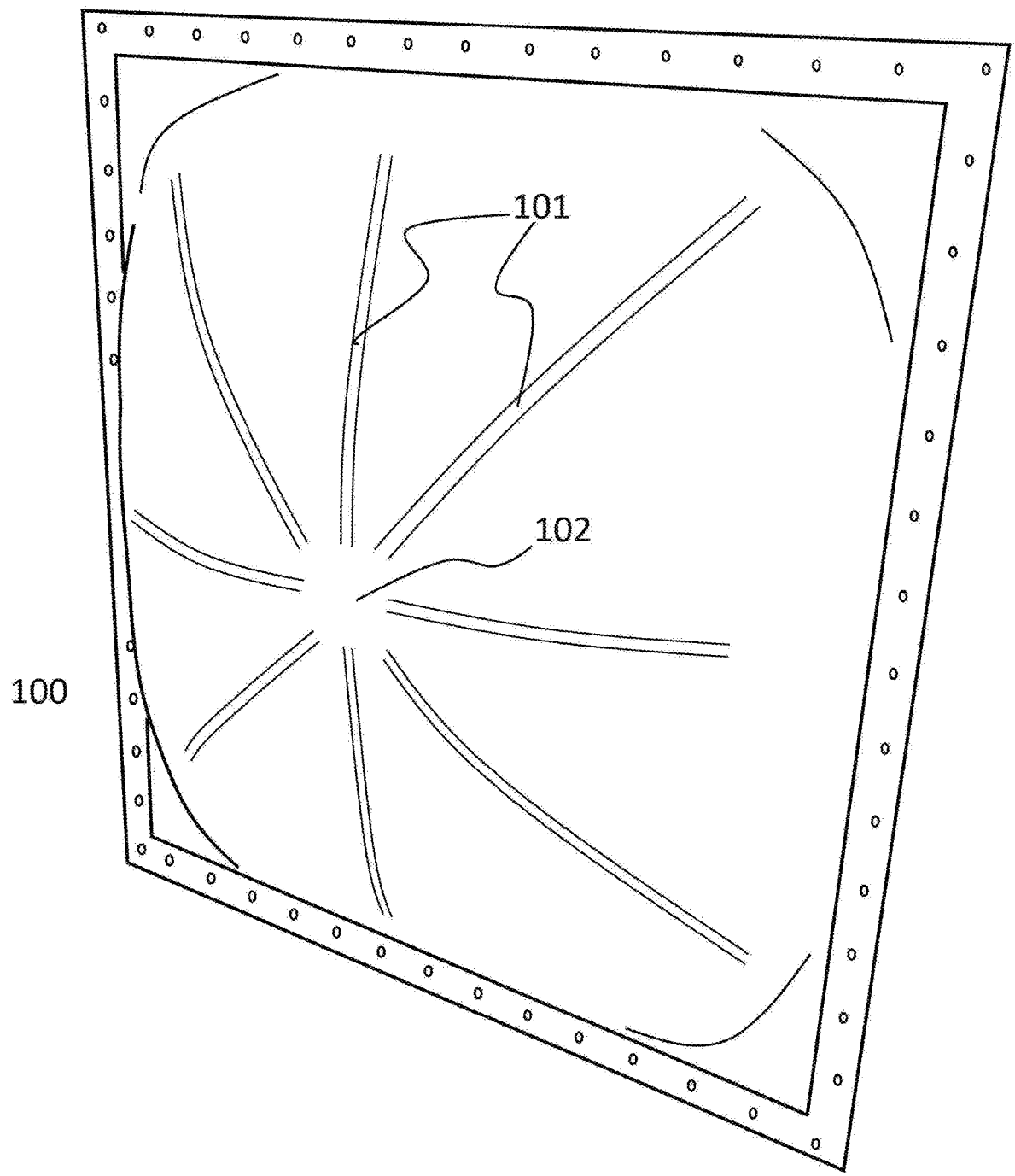
FIG. 1 is an illustration of a membrane pressure relief device in the form of a compound-dome explosion vent with radial rib structures.

FIG. 1 illustrates an exemplary membrane pressure relief device in the form of an explosion vent 100. The illustrated vent is 36-inches×36-inches (91.4-cm×91.4-cm) with a nominal burst pressure of 1.5 psi (0.1 bar). The dimensions and burst pressures of FIG. 1 are exemplary only, and the disclosure is not limited to any particular dimension or burst pressure. As illustrated in FIG. 1, the explosion vent includes a corner compound dome feature, which boosts vacuum resistance to around half of full vacuum. As illustrated, the dome is provided with a relatively high slope (i.e., steep sides), which has been discovered to provide improved performance.

The explosion vent of FIG. 1 includes eight radial ribs 101, which (in the illustrated embodiment) terminate short of the center/apex 102 of the explosion vent—i.e., the ribs do not intersect, and the apex of the vent is flat. The provided ribs have been demonstrated to increase vacuum resistance to full vacuum. The explosion vent of FIG. 1 has further been tested to demonstrate 23 psig of back pressure, which provides a significant (and desirable) design safety margin for a product which might be exposed to a full vacuum condition of nominal 14.7 psig back pressure.

As illustrated in FIG. 1, the radial rib pattern forms a rib 101 that is indented into the convex side of the domed shape (such that it bulges outward from the concave side of the domed shape). It is contemplated, however, that a rib pattern may face in the opposite direction (e.g., indented into the concave side). It is further contemplated that one or more rib lines may be indented in a combination of different directions. For example, part of one rib line may be indented into the concave side while another part of the same rib line (which may or may not be a continuous rib line) may be indented into the convex side. As another example, one rib line may be indented into one side of the domed shape, while a different rib line may be indented into the opposite side.

Although the explosion vent 100 of FIG. 1 is illustrated as a square explosion vent having a corner compound dome and radial rib structure, the disclosure contemplates additional configurations, including the following:

radial ribbed structure formed into a square or rectangular explosion vent (with or without a corner compound dome);

ribbed structure comprising at least one set of diagonal members corner to corner on a square or rectangular explosion vent (with or without a corner compound dome);

ribbed structure (including diagonal or radial ribbed structure) that is continuous, or intermittent, or a combination thereof;

radial ribbed structure formed into a circular or rounded explosion vent;

ribbed structure that divides the vent (e.g., a square, rectangular, circular, or rounded vent) into at least three segments which may be of equal size;

ribbed structure that divides the vent (e.g., a square, rectangular, circular, or rounded vent) into at least three segments which may be of different sizes;

ribbed structure that includes at least two ribs, wherein the ribs have different lengths, widths, depths, or other different physical attributes;

ribbed feature having a substantially V-shaped, U-shaped, or W-shaped cross section, which may be centered on the explosion vent;

ribbed feature having an offset V-shaped, U-shaped, or W-shaped cross section;

ribbed feature having a circular shape or C-shaped configuration, which may encircle or partially encircle the apex of a domed explosion vent;

ribbed feature converging at the apex of a domed explosion vent;

ribbed feature converging at a point separate from the apex of a domed explosion vent;

at least two radial ribbed patterns placed in a domed rectangular structure, wherein the two ribbed patterns may be side-by-side or randomly placed, and wherein the two ribbed patterns may be of the same (or different) dimensions.

Figure 12:
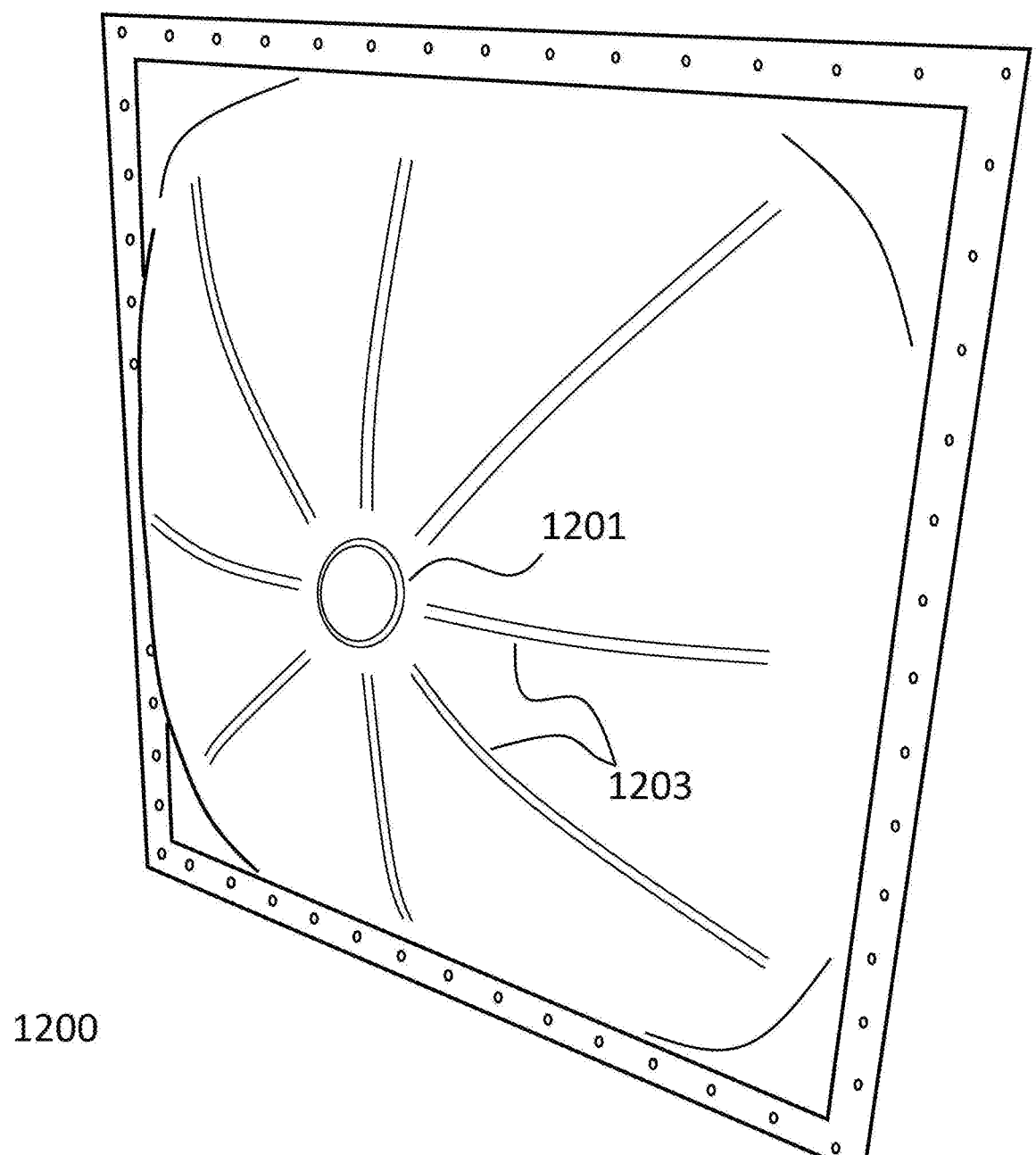
FIG. 12 illustrates an additional embodiment of an explosion vent having ribbed structures.

It is further contemplated that the foregoing features may be combined with each other in accordance with the present disclosure. As one example, a central ribbed feature (1201, FIG. 12) having a circular or C-shaped configuration may be positioned centrally on a domed explosion vent (1200). The domed explosion vent may further include radial ribbed features (1203) extending partially across a distance between the circular or C-shaped ribbed portion and the outer periphery of the domed explosion vent, as illustrated in FIG. 12.

In addition to providing vacuum resistance, one or more of the features described above may provide improved vibration stability of a membrane pressure relief device. Vibration stability may be desirable to increase the longevity of a membrane pressure relief device. Additionally, or alternatively, one or more of the foregoing features may provide improved resistance to loading caused by wind, precipitation, snow accumulation, or other environmental causes.

In one embodiment, a membrane pressure relief device (e.g., the vent 100 illustrated in FIG. 1) may be manufactured by a pressure-forming process. For example, a sheet metal (e.g., stainless steel) may be pressure-formed into a tool having a rib pattern in place. In one embodiment, hydraulic pressure may be used. While FIG. 1 is depicted with a pressure-formed rib structure, it is contemplated that a rib structure may be formed by other processes, such as casting, molding (e.g., injection molding), stamping or other suitable processes. It is further contemplated that a reinforcing structure may be provided by means other than a rib formed from the material of the vent. For example, a domed vent structure may be provided with secondary strengthening members, such as precision strips of material, tubular members, or other shaped pieces. In one embodiment, a secondary strengthening member may be made of metal; however, other materials may be used, such as plastic or glass fiber. In one embodiment, a secondary strengthening member may be applied to the outlet side of a device, so as not to add crevices that might accumulate dusty material on the inside of the device.

While FIG. 1 illustrates an explosion vent 100 that is pressure-formed from sheet metal, it is contemplated that other materials and methods of manufacture may be used for an explosion vent or member. For example, a membrane pressure relief device may be comprised of plastic or a composite material, which also may be provided with a rib structure (or with secondary strengthening members). Such a vent may be formed via pressure-molding, forming, casting, molding (e.g., injection molding), stamping or another suitable method of manufacture.

It is further contemplated that a membrane pressure relief device may comprise more than one layer of material. In one example, an explosion vent (or a rupture disk) may be a compound vent having an inlet panel and an outlet panel, which may cooperate to enhance back-pressure resistance (or provide other advantages). One or more of the inlet and outlet panel may be provided with ribs (such as illustrated in FIG. 1), which may, for example, be used to enhance the vacuum or back pressure resistance of the panel component (s) by this structural means. A membrane of flexible seal material may be included between the inlet and outlet panel to achieve a leak tight construction.

FIG. 1 illustrates a peripherally opening explosion vent 100, which is designed to open along at least a part of its periphery (e.g., along a line of weakness or laser-cut line positioned near the junction between the vent dome and the flange). It is contemplated, however, that embodiments of the present disclosure may be used with an explosion vent (or rupture disk) that is designed to open interiorly. For example, an explosion vent (or rupture disk) may be provided with one or more lines of weakness creating a diagonal or radial opening pattern in an interior region of the material. In such an embodiment, a line of weakness may be created by laser cutting (or other cutting) and covered by gasket material to achieve a leak-tight vent construction.

As noted above, in one embodiment, an explosion vent 100 such as illustrated in FIG. 1 may be provided with one or more lines of weakness (e.g., a scored, sheared, or etched line, or a line formed via laser cutting or laser ablation) at which the explosion vent may be configured to open in the event of an over-pressure condition. In one embodiment, a line of weakness may be perforated. Where a line of weakness is provided, the explosion vent may further be provided with one or more burst control tabs. An exemplary burst control tab feature is described, for example, in co-owned U.S. Pat. No. 6,792,964, the entire contents of which is hereby incorporated by reference.

A burst control tab may be attached to the explosion vent at or near the line of weakness. A burst control tab may be used to provide additional vacuum resistance. Additionally, or alternatively, a burst control tab may be used to control the pressure at which the explosion vent will open. Using such a tab may, for example, permit the use of different materials for the tab and vent body. In one embodiment, a vent body may be comprised of stainless steel, aluminum, or some other relatively low-cost material, while a tab may be comprised of more expensive material, such as Inconel. In another embodiment, a vent body may be comprised of a material whose properties may not lend themselves to reliable set pressure or longevity (e.g., plastics, composites, glass fiber, or coated carbon steel). Burst control in such an embodiment may be provided by a burst control tab made of a different material.

In another embodiment, an explosion vent such as illustrated in FIG. 1 may be provided with one or more stress distribution features configured to distribute stress away from or transverse to a line of weakness. An exemplary stress-distribution feature is described, for example, in co-owned U.S. Pat. No. 6,792,964, the entire contents of which is hereby incorporated by reference. It is contemplated, for example, that a line of weakness may be provided with at least one endpoint. One or more stress distribution features may be disposed near the endpoint of the line of weakness. A stress distribution feature may be any feature configured to distribute stress. For example, a stress distribution feature may be a slit, a score line, or a raised ridge that protrudes from a surface of the explosion vent. A stress distribution feature may take the form of a straight or curved line or may be a combination of linear and curved segments. A stress distribution feature may be oriented at various angles relative to a line of weakness.

A stress distribution feature may prevent the fragmentation of an explosion vent. If the opening of an explosion vent is violent enough to cause a tear to propagate from an endpoint of a line of weakness, then such a tear will encounter a stress distribution feature. The stress distribution feature provides a line of weaker material disposed in a direction transverse to line of weakness and the expected direction of material tearing. When the material tear reaches stress distribution feature, it is expected that any continued tearing will follow the direction of weaker material of stress distribution feature. Thus, any continued tearing of the material of the explosion vent will likely be in a direction that is transverse to the direction of line of weakness.

In this manner, a stress distribution feature may divert or deflect the direction of material tearing. Thus, a stress distribution feature may prevent the tear from propagating across a hinge area of an explosion vent. By reducing tear propagation across an unweakened hinge area, a stress distribution feature may prevent an explosion vent from fragmenting.

In addition, a small hole may be disposed at either end of a stress distribution feature. Each small hole may prevent the material of the explosion vent from tearing past the end of the stress distribution feature. If the force of the fluid on explosion vent causes the material of explosion vent to tear along a stress distribution feature, the tear may eventually reach the ends of stress distribution feature. A small hole at an end of stress distribution feature will distribute the tearing stresses over the circumference of the small hole. Thus, greater stresses will be required to continue the material tearing past the small hole. If the stresses are not great enough to continue tearing the material, the tear will end at the hole, thereby preventing fragmentation of explosion vent.

Figure 2:
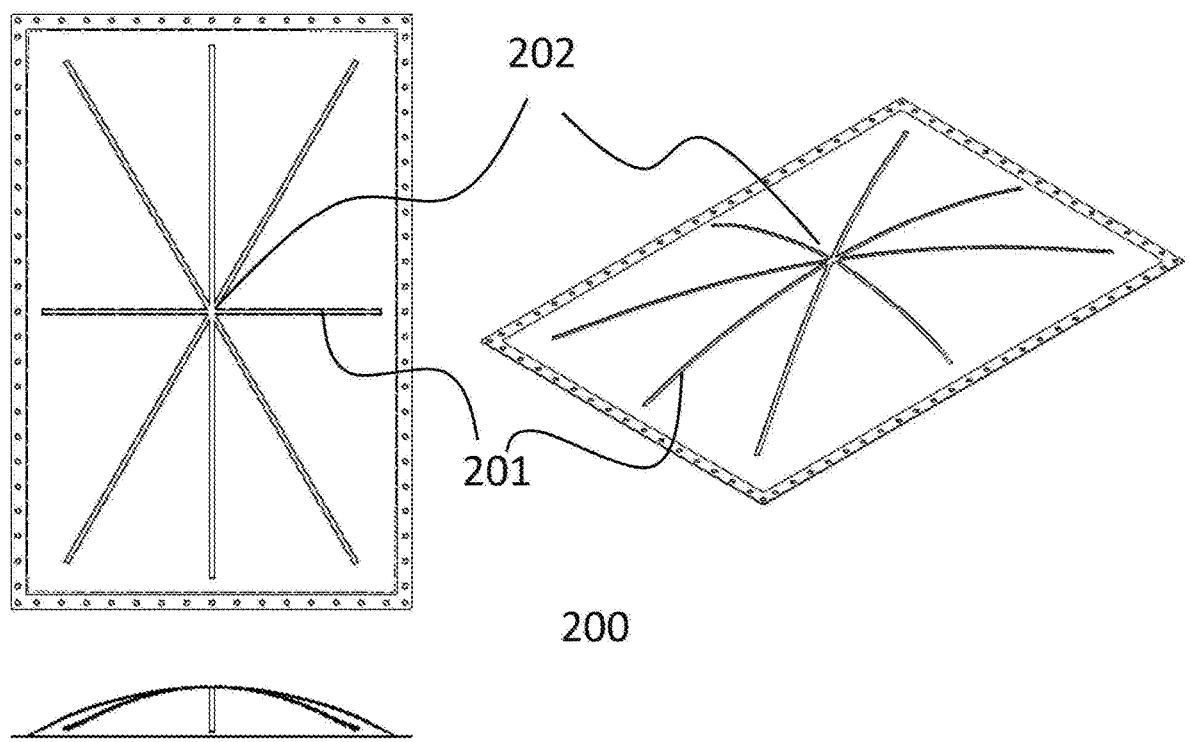
FIG. 2 illustrates another embodiment of a domed square explosion vent having radial rib structures.

FIG. 2 illustrates another embodiment of a square explosion vent 200. As illustrated, the square explosion vent is domed and is provided with four radial, intersecting ribs 201. According to FIG. 2, the radial ribs intersect at the center/apex 202 of the domed explosion vent. It is further contemplated in other embodiments that radial ribs may intersect at a point offset from the center/apex of a domed explosion vent. In one embodiment, an explosion vent may be provided with an offset dome configuration, wherein the apex of the dome is offset from the geometric center of the explosion vent. In such an embodiment, radial ribs may be provided with an intersection at the offset dome apex. Alternatively, radial ribs may intersect at a point away from the offset dome apex.

Figure 3:
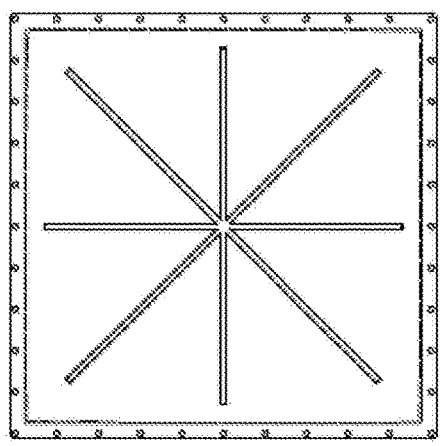
FIG. 3 illustrates an embodiment of a rectangular domed explosion vent having ribbed structures.
Figure 3:
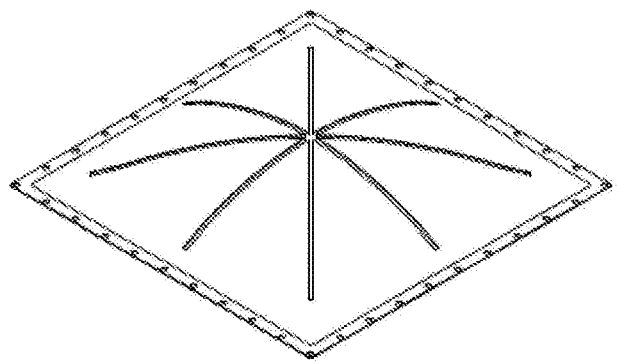
Figure 3:
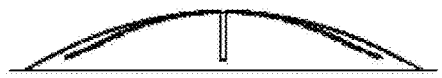

FIG. 3 illustrates an embodiment of a rectangular domed explosion vent 300 having ribbed structure.

Figure 4:
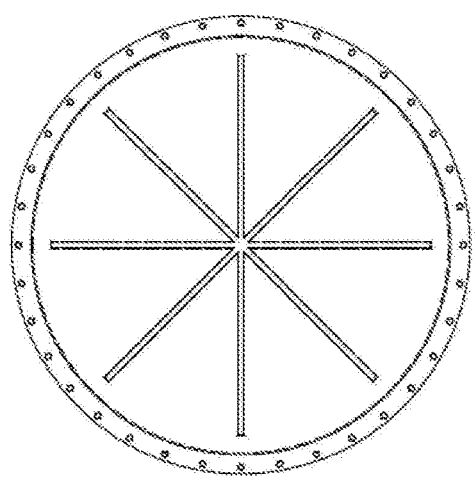
FIG. 4 illustrates an embodiment of a round domed explosion vent having ribbed structures.
Figure 4:
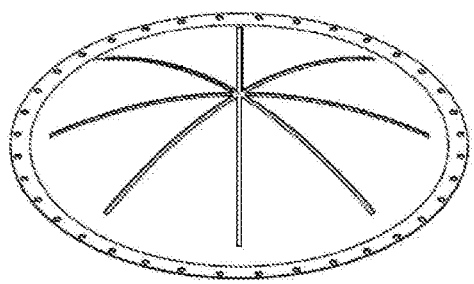
Figure 4:
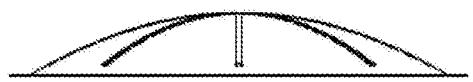

FIG. 4 illustrates an embodiment of a round domed explosion vent 400 having ribbed structure. The explosion vent in FIG. 4 is illustrated as circular; however, other round vents are contemplated (e.g., oval-shaped vents).

Figure 5:
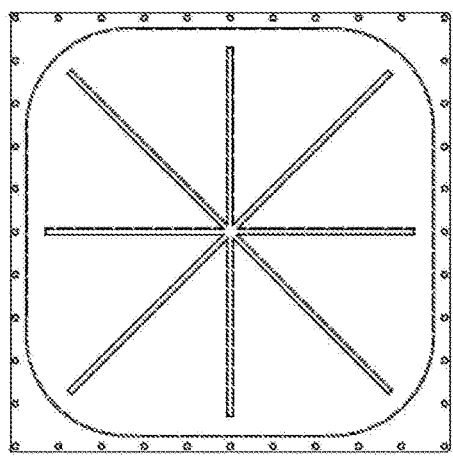
FIG. 5 illustrates an embodiment of a square domed explosion vent having ribbed structures and a peripheral line of weakness.
Figure 5:
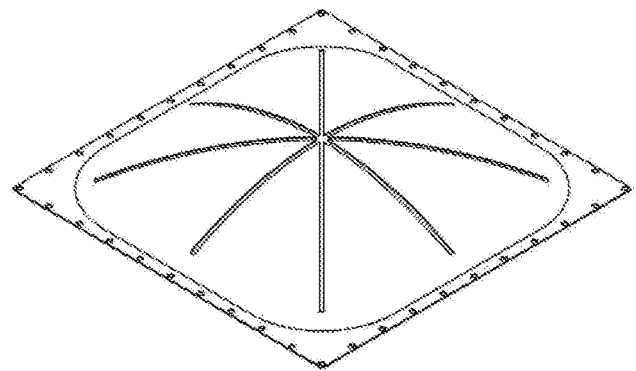
Figure 5:
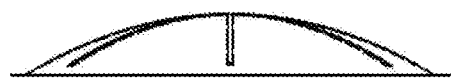

FIG. 5 illustrates an embodiment of a square domed explosion vent 500 having ribbed structure and a peripheral line of weakness.

Figure 6:
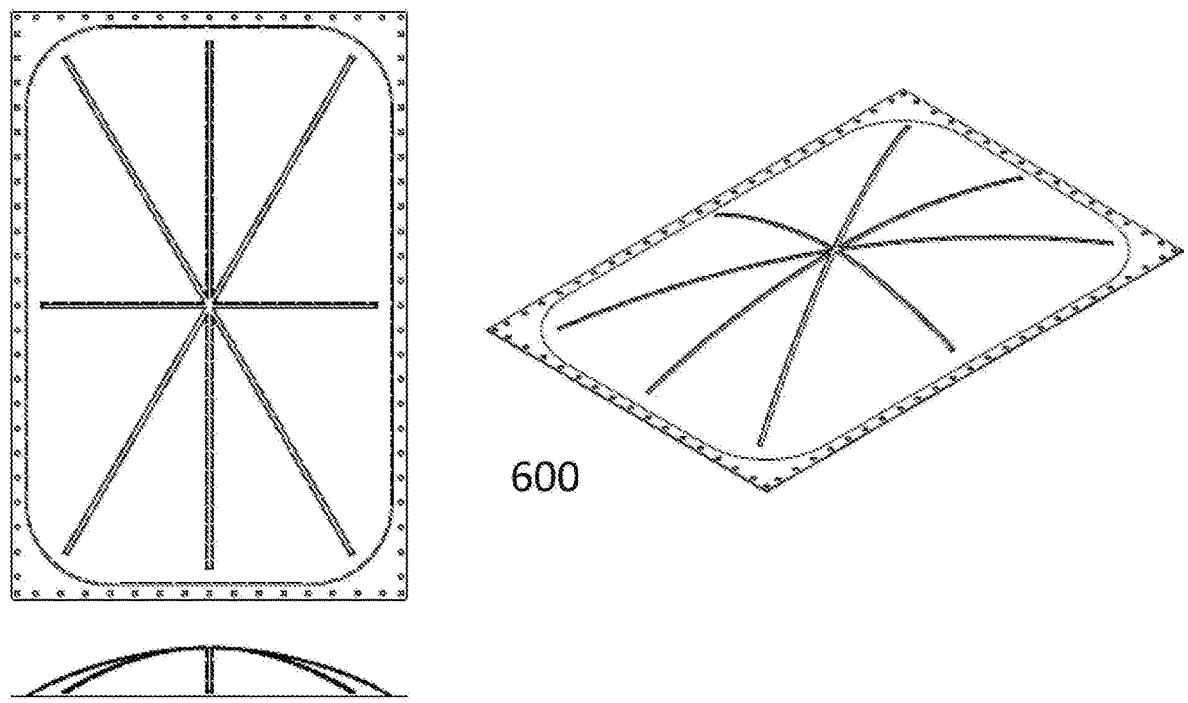
FIG. 6 illustrates an embodiment of a rectangular domed explosion vent having ribbed structures and a peripheral line of weakness.

FIG. 6 illustrates an embodiment of a rectangular domed explosion vent 600 having ribbed structure and a peripheral line of weakness.

Figure 7:
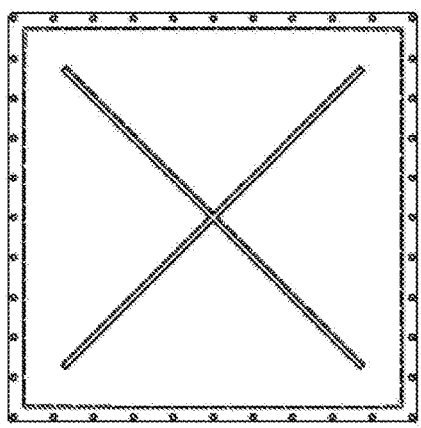
FIG. 7 illustrates another embodiment of a square domed explosion vent having ribbed structures.
Figure 7:
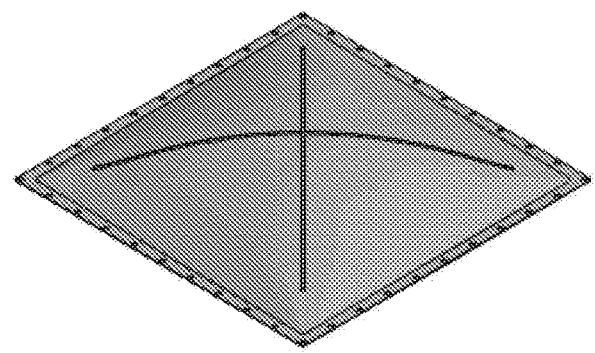
Figure 7:
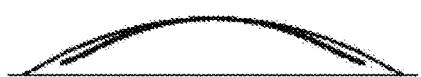

FIG. 7 illustrates another embodiment of a square domed explosion vent 700 having ribbed structure.

Figure 8:
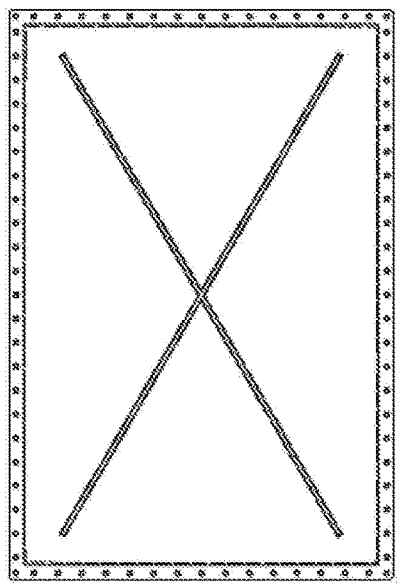
FIG. 8 illustrates another embodiment of a rectangular domed explosion vent having ribbed structures.
Figure 8:
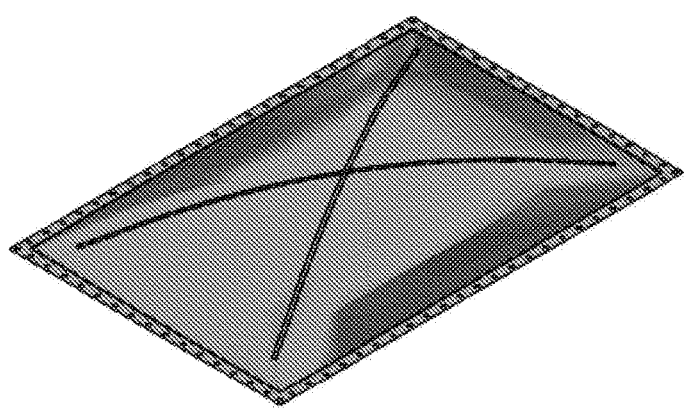
Figure 8:
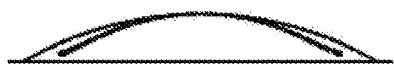

FIG. 8 illustrates another embodiment of a rectangular domed explosion vent 800 having ribbed structure.

Figure 9:
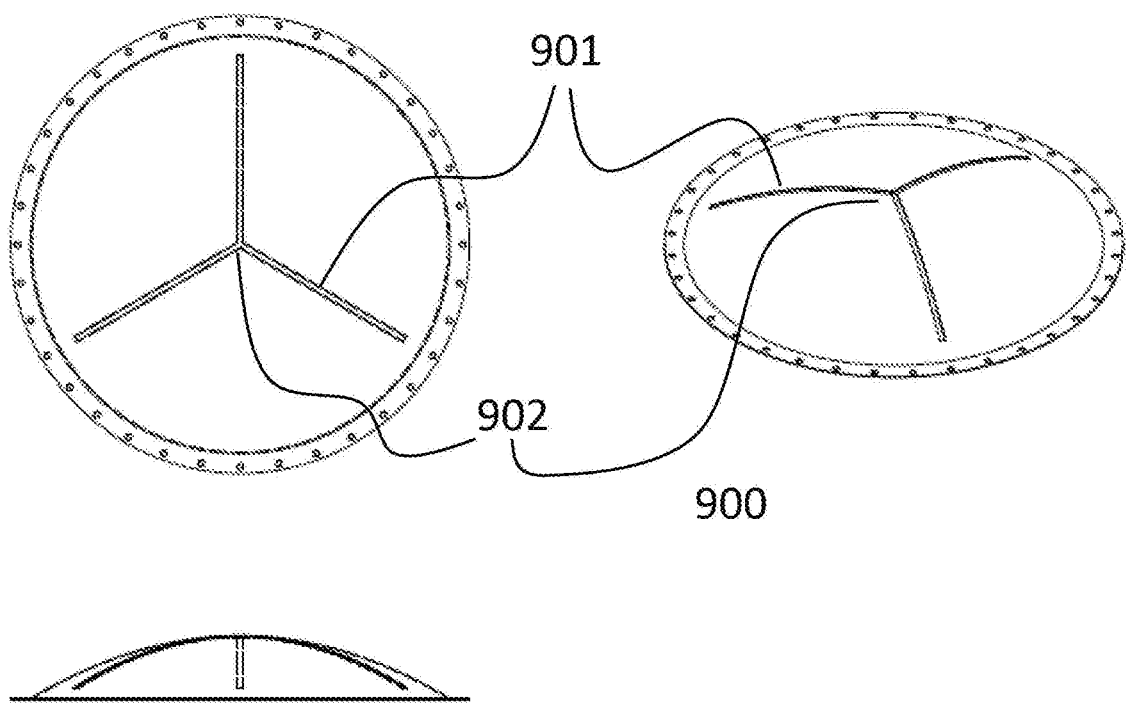
FIG. 9 illustrates another embodiment of a round domed explosion vent having ribbed structures.

FIG. 9 illustrates another embodiment of a round domed explosion vent 900 having ribbed structure. As illustrated in FIG. 9, three radial ribs 901 are illustrated with an intersection at the apex 902 of the dome. The three radial ribs divide the dome into three equal segments (each segment defining a 120° arc of a circle).

Figure 10:
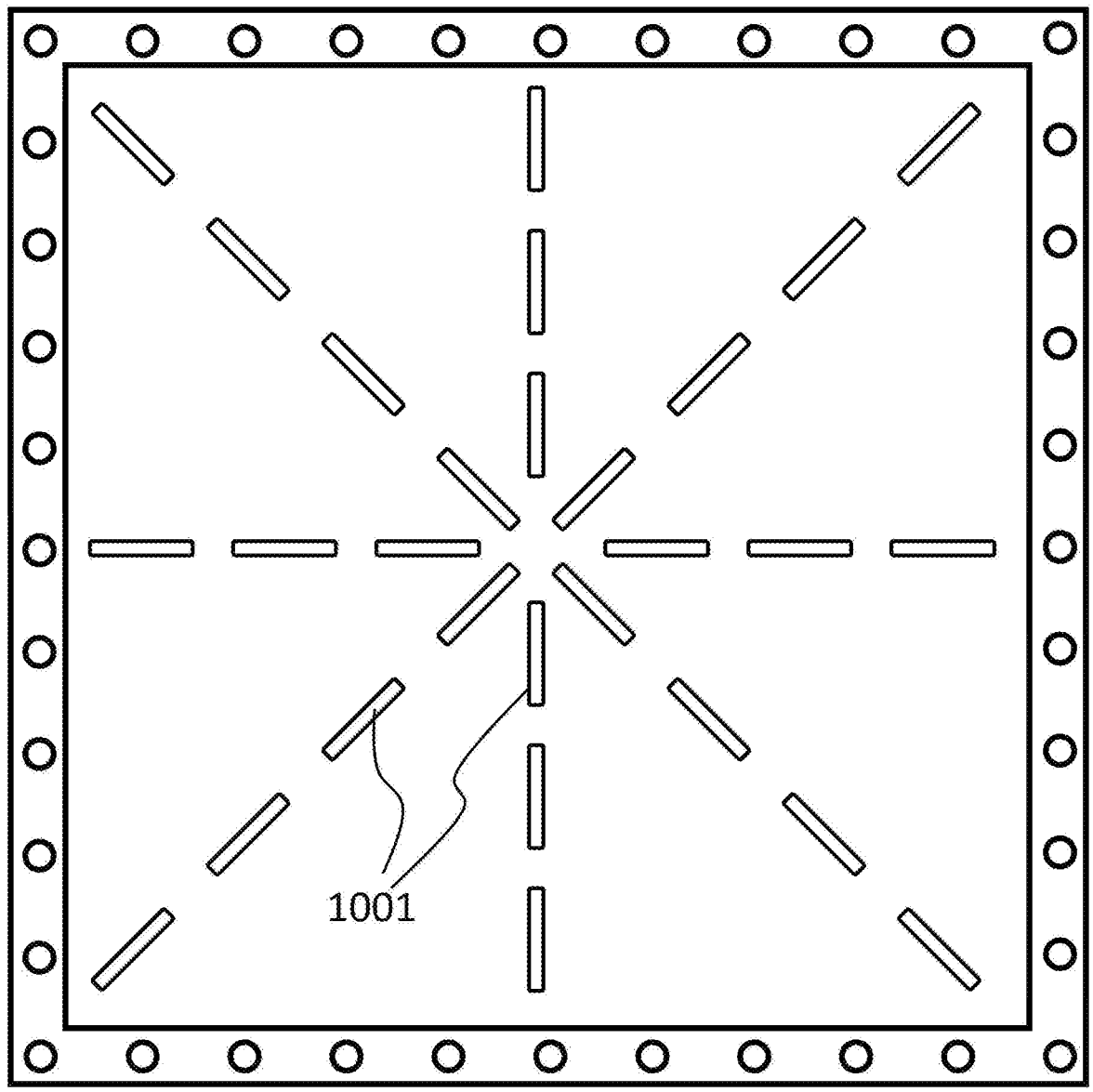
FIG. 10 illustrates another embodiment of a square domed explosion vent having ribbed structure; and, FIGS. 11A and 11B illustrate additional embodiments of a round domed explosion vent having ribbed structures.

FIG. 10 illustrates another embodiment of a square domed explosion vent 1000 having ribbed structure 1001. As illustrated in FIG. 10, the ribbed structure takes the form of intermittently ribbed lines. It is contemplated that such intermittent ribbed lines may be substituted for (or added to) the ribbed structures illustrated in other embodiments disclosed herein.

Figure 11A:
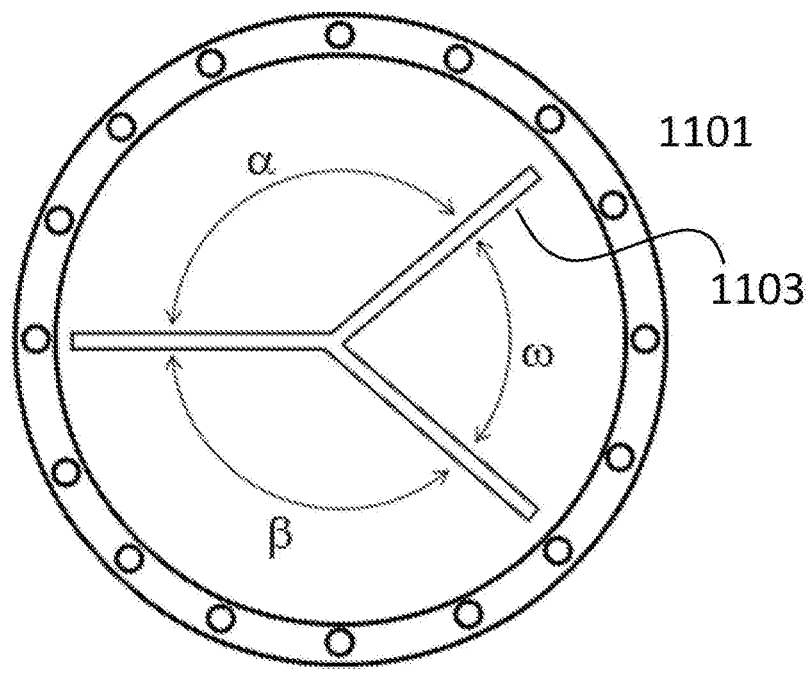
Figure 11B:
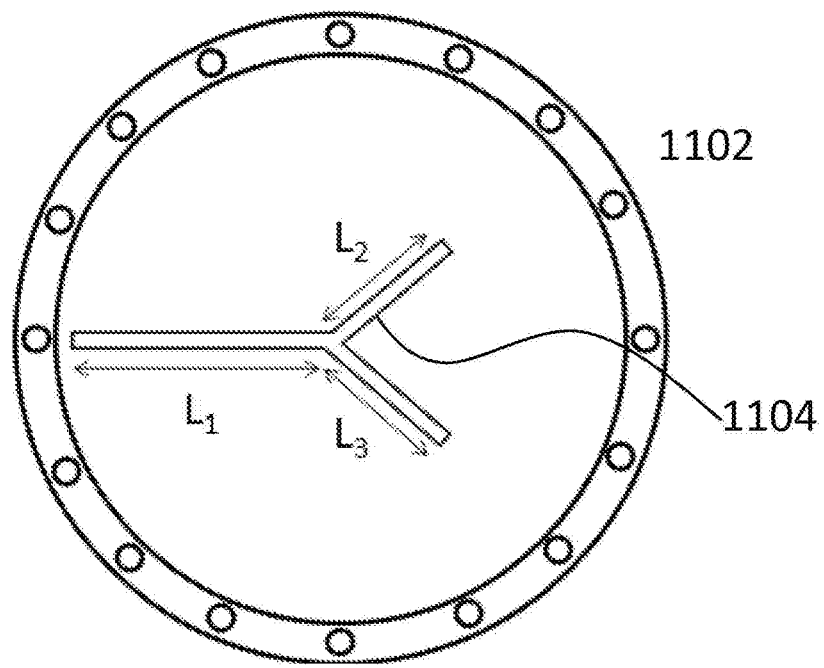

FIGS. 11A and 11B illustrate additional embodiments of a round domed explosion vent having ribbed structure. As illustrated in FIG. 11A, for example, ribbed structures 1103 may divide an explosion vent 1101 into segments of different sizes. By way of non-limiting example, a three-ribbed embodiment (such as in FIG. 11A) may define a first segment comprising $\sigma°$ of a circle, a second segment comprising $\beta°$ of a circle, and a third segment comprising $\omega°$ of a circle. By way of example, in FIG. 11A, $\alpha$ and $\beta$ are 140° and $\Omega$ is 80°; however, the disclosure contemplates other combinations of segment sizes. As illustrated in FIG. 11B, an explosion vent 1102 may be provided with multiple ribbed structures 1104, wherein one or more of the ribbed structures has a different shape or length. Specifically, as shown in FIG. 11B, a first ribbed structure has a length $L_1$, a second ribbed structure has a length $L_2$, and a third ribbed structure has a length $L_3$. In FIG. 11B, $L_2$ and $L_3$ are half of $L_1$; however, the disclosure contemplates other combinations of rib lengths.

While several of the foregoing illustrated embodiments are directed to rib structure that extends across substantially an entire width of an explosion vent, the disclosure is not so limited. For example, it is contemplated that one or more ribs on an explosion vent (or rupture disk) may be truncated and extend only partially across a width of an explosion vent. In one embodiment, a plurality of ribs may join at a central convergence, while one or more of the ribs is truncated before reaching the periphery of the explosion vent. In another embodiment, one or more ribs may have a first extent near the periphery of the explosion vent and a second extent that stops short of the center of the explosion vent. It is contemplated that a combination of such truncated ribs (or a combination of truncated ribs with non-truncated ribs) may be used. It is further contemplated that an explosion vent may be provided with a plurality of ribs, wherein the ribs may be of different lengths or may be distributed in a non-uniform configuration.

While the foregoing illustrated embodiments are directed to explosion vents, the principles of the present disclosure may be applied to other membrane-type pressure relief devices, such as rupture disks. For example, the disclosed rib structures may be applied to a reverse-buckling rupture disk to achieve control of pressure resistance and burst pressure accuracy. In a rupture disk embodiment, for example, a rib structure may be combined with one or more lines of weakness to combine one or more performance attributes (e.g., burst pressure, burst pressure accuracy, vacuum/back pressure resistance, opening pattern, operating ratio, control of fragmentation).

Principles of the present disclosure also may be applied to a forward-acting rupture disk. For example, a forward-acting rupture disk may be provided with a rib structure to achieve vacuum resistance without the need for an additional vacuum or back-pressure support. Such a disk may be, for example, a plain solid metal disk (such as the "type B" disk offered commercially by BS&B Safety Systems Limited) or a scored solid metal disk (such as the scored "XT" and "GFN" disk). It is contemplated that ribs and lines of weakness may be crafted to combine one or more performance attributes (e.g., burst pressure, burst pressure accuracy, vacuum/back-pressure resistance, opening pattern, operating ratio, or control of fragmentation).

The previously discussed embodiments are disclosed as exemplary only and not as limiting the scope of the disclosure to the particular embodiments. Every embodiment disclosed above is not intended to be exclusive or stand alone. For example, it is contemplated that the particular features in any one embodiment can be substituted for, or replaced with, the features of any other embodiment (even though such a particular embodiment may not be explicitly disclosed).

Other embodiments of the disclosure will be apparent to those skilled in the art from consideration of the specification and practice of the disclosure herein. It is intended that the specification and examples be considered as exemplary only.

What is claimed is:

1. A pressure relief device, comprising:
    a domed rupturable membrane having an apex;
    wherein the domed rupturable membrane comprises at least a first and a second strengthening rib formed into the membrane material, wherein the at least a first and a second strengthening rib extend radially outward from the apex of the domed rupturable membrane;
    wherein the at least a first and a second strengthening rib terminate short of the apex and do not intersect.

2. The pressure relief device of claim 1, wherein the domed rupturable membrane is a compound dome.

3. The pressure relief device of claim 1, further comprising:
    a circular or C-shaped rib, wherein the circular or C-shaped rib at least partially encircles the apex of the domed rupturable membrane; and
    wherein the at least a first and second strengthening rib extend radially outward from the circular or C-shaped rib.

4. The pressure relief device of claim 1, wherein the at least a first and second strengthening rib are provided by pressure-forming.

5. The pressure relief device of claim 1, wherein at least one strengthening rib is provided by a secondary strengthening member.

* * * * *